(12) United States Patent
Ayoub

(10) Patent No.: US 11,155,961 B2
(45) Date of Patent: Oct. 26, 2021

(54) FIBERS-BASED FLEXIBLE MATERIAL AND PROCESS OF MANUFACTURING SUCH A MATERIAL

(71) Applicant: Naim Antoine Ayoub, Mont Dore (FR)

(72) Inventor: Naim Antoine Ayoub, Mont Dore (FR)

(*) Notice: Subject to any disclaimer, the term of this patent is extended or adjusted under 35 U.S.C. 154(b) by 532 days.

(21) Appl. No.: 16/008,839

(22) Filed: Jun. 14, 2018

(65) Prior Publication Data

US 2019/0382954 A1 Dec. 19, 2019

(51) Int. Cl.
| | | |
|---|---|---|
| *D06N 3/00* | (2006.01) | |
| *B32B 5/02* | (2006.01) | |
| *B32B 27/12* | (2006.01) | |
| *B32B 27/30* | (2006.01) | |
| *B32B 38/08* | (2006.01) | |

(52) U.S. Cl.
CPC ......... *D06N 3/0015* (2013.01); *D06N 3/0006* (2013.01); *D06N 3/0011* (2013.01); *D06N 3/0056* (2013.01); *B32B 5/022* (2013.01); *B32B 5/024* (2013.01); *B32B 27/12* (2013.01); *B32B 27/306* (2013.01); *B32B 38/08* (2013.01); *B32B 2255/02* (2013.01); *B32B 2260/021* (2013.01); *B32B 2260/046* (2013.01); *B32B 2262/101* (2013.01); *B32B 2262/106* (2013.01); *B32B 2305/18* (2013.01); *B32B 2307/50* (2013.01); *B32B 2331/04* (2013.01); *D06N 2201/082* (2013.01); *D06N 2201/087* (2013.01); *D06N 2203/045* (2013.01); *D06N 2209/103* (2013.01)

(58) Field of Classification Search
CPC .......... B32B 2255/02; B32B 2260/021; B32B 2260/046; B32B 2262/101; B32B 2262/106; B32B 2307/50; B32B 2331/04; B32B 2437/00; B32B 27/12; B32B 27/306; B32B 38/08; B32B 5/022; B32B 5/024; D06M 17/06; D06N 2201/0272; D06N 2201/082; D06N 2201/087; D06N 2203/045; D06N 2209/103; D06N 3/0006; D06N 3/0011; D06N 3/0015; D06N 3/0022; D06N 3/0056; D06N 3/0059; D06N 3/04
USPC ....................................................... 442/286
See application file for complete search history.

(56) References Cited

U.S. PATENT DOCUMENTS

| 2,949,394 | A | | 8/1960 | Rodman | |
|---|---|---|---|---|---|
| 4,242,397 | A | | 12/1980 | Ferment et al. | |
| 2008/0241494 | A1 | * | 10/2008 | Ardiff | F41H 5/0478 428/219 |

FOREIGN PATENT DOCUMENTS

| DE | 202 21 400 U1 | 11/2005 | |
|---|---|---|---|
| EP | 2602385 A1 * | 6/2013 | ........... D06N 7/0002 |
| GB | 825893 A * | 12/1959 | ............... C08K 5/10 |

(Continued)

OTHER PUBLICATIONS

Machine translation of ep2602385 (Year: 2013).*
French Search Report, dated Jul. 15, 2016, from corresponding FR application No. 1562061.

*Primary Examiner* — Vincent Tatesure
(74) *Attorney, Agent, or Firm* — Nixon & Vanderhye

(57) ABSTRACT

Disclosed is a flexible material including a web of fibers chosen in the group consisting of carbon fibers, glass fibers and aramid fibers, this web of fibers being impregnated on a so-called external face with an impregnation layer produced from a polymer binder and containing at least one plasticizing agent or a mixture of plasticizing agents. A fibrous textile substrate is superimposed on the web of fibers on an internal face of the web opposite the external face.

18 Claims, 1 Drawing Sheet

(56) References Cited

FOREIGN PATENT DOCUMENTS

| GB | 1092499 A | * 11/1967 | ............ C09J 157/00 |
| GB | 2 048 717 A | 12/1980 | |
| WO | 2012/085956 A1 | 6/2012 | |

* cited by examiner

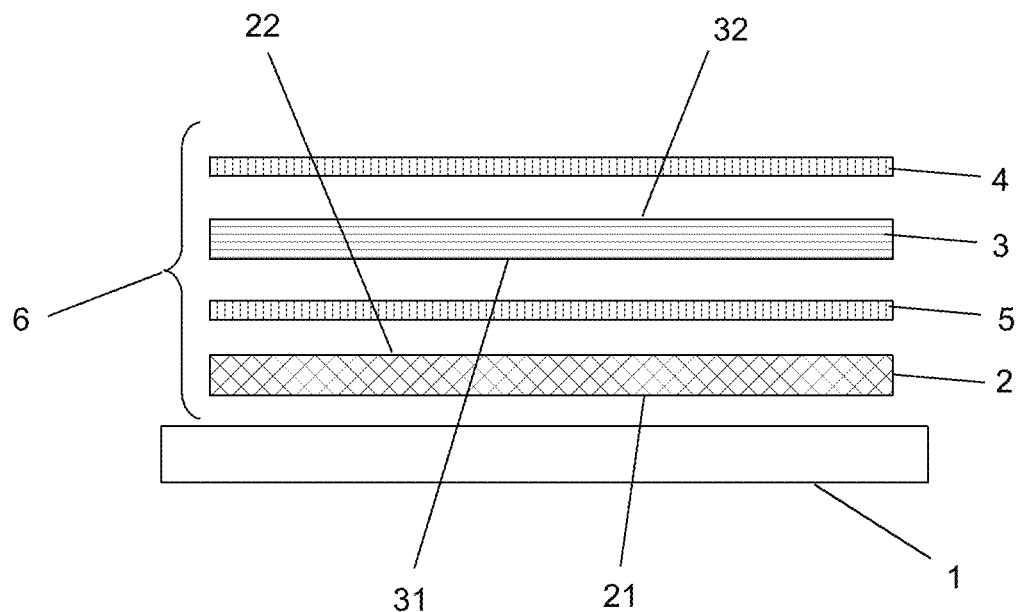

FIBERS-BASED FLEXIBLE MATERIAL AND PROCESS OF MANUFACTURING SUCH A MATERIAL

TECHNICAL FIELD

The present invention concerns flexible materials which can be used for the manufacture of textile articles such as clothing or accessories. More specifically, it relates to a flexible material made from fibers chosen from carbon fibers, glass fibers and/or aramid fibers, as well as to a process of manufacturing such a material and to an article formed of such a material.

PRIOR ART

Carbon, glass and aramid fibers, currently called reinforcing fibers, have the particularity of presenting a high mechanical resistance. This property makes them particularly suitable for the manufacture of rigid composite materials that are largely used in many domains such as the aeronautics, automobile and maritime fields. To this effect, the fibers, which can be organized according to different arrangements, are distributed in a matrix of organic polymer resin.

As such, the layers formed from such fibers cannot be used for the manufacture of articles in the textile field, such as bags, clothing etc., especially because, during their manipulation, they are subject to cracking and they lose their cohesion, whatever the particular arrangement of the fibers therein, either woven or unwoven.

The present invention aims to propose a material based on carbon, glass and/or aramid fibers, which takes advantage of the high mechanical resistance of these fibers, while being sufficiently flexible to be able to be easily used for the manufacture of textile articles, such as clothing or accessories, bags or luggage for example.

An additional objective of the invention is that such a material be easy and cost-effective to manufacture.

PRESENTATION OF THE INVENTION

To this effect, the present invention proposes a flexible material comprising a web of fibers chosen in the group consisting of carbon fibers, glass fibers, aramid fibers and any combination thereof, wherein the web of fibers is impregnated on a first face, called the external face, of a first impregnation layer produced from a polymer binder and containing at least one plasticizing agent or a mixture of plasticizing agents. Said material comprises a fibrous textile substrate superimposed on a second face of said web of fibers, called the internal face, opposite said external face.

In specific embodiments of the invention, the total concentration of plasticizing agent(s) in said first impregnation layer is greater than or equal to 10% by weight, preferably greater than or equal to 30% by weight, with respect to the total weight of the impregnation layer.

In the present description, a flexible material means a material which can be manually deformed without excessive effort.

This web of fibers can be either a non-woven or a woven web. In this latter case, which is particularly preferred in the context of the invention, the woven web can have any form and any weight.

This web of fibers is coated on its surface, at least on its external face, by the first impregnation layer which is mainly formed of the polymer binder and of the plasticizing agent(s), this first impregnation layer being intimately bonded to the fibers. Advantageously, said first impregnation layer, on the one hand, ensures the cohesion of the fibers, so that during its manipulation the material does not undergo any cracking, and on the other hand, it reinforces the natural flexibility of the web of fibers. The material according to the invention may also advantageously be manipulated, bent, cut, sewn, embroidered or screen-printed, without deterioration. In particular, when it is bent or deformed, it returns spontaneously to its initial state without any alteration of its integrity, without cracking or fold marks. Furthermore, it presents great mechanical resistance and it is waterproof.

Furthermore, this material has a good aesthetic appearance, which makes it highly suitable for use in the field of manufacturing textile items such as clothing, bags, suitcases, etc. It is within the skills of the person skilled in the art to choose the weave and weight of the web of fibers forming this material in order to give the material the desired aesthetic aspect and physical characteristics.

According to preferred embodiments, the invention has the following characteristics, implemented separately or in each of their technically operating combinations.

In particular embodiments of the invention, the polymer binder is a co-polymer of vinylpyrrolidone and of vinyl acetate.

The polymer binder of the first impregnation layer may be obtained in any conventional manner. In particular, it may be obtained by cross-linking one or several precursor monomers in the presence of a curing agent that is conventional for the type of polymer binder used. This cross-linking is carried out after coating the web of fibers with a composition, which is preferably prepared extemporaneously, comprising a mixture of the precursor monomers for the polymer binder and of the curing agent. It can be carried out by drying at ambient temperature, that is to say, a temperature between about 15 and 30° C. Otherwise, the cross-linking may be accelerated by heating the web of fibers coated with the composition.

In specific embodiments of the invention, the first impregnation layer contains, as plasticizing agent(s), at least one component chosen in the group consisting of adipic acid esters, comprising both cyclic and non-cyclic esters, such as the bis(2-ethylhexyl adipate (DEHA); phthalates, such as dicyclohexyl phthalate (DCHP); or any mixture thereof.

Preferably, the first impregnation layer contains, as plasticizing agent(s), a mixture of phthalates, straight chained or branched, preferably comprising at least 18 carbon atoms, and of adipic acid esters, in particular a mixture of cyclic esters and non-cyclic esters.

The fibrous textile substrate may present any form. It may for example be a woven fabric, a knitted fabric, a multi-directional mat, a felt, etc. It constitutes a sub-layer for the web of fibers, which masks any defects of this web, especially any possible weaving defects which can leave apparent holes between the fibers. This substrate further gives the material a better feel on one of its faces, and it facilitates its manipulation for cutting and sewing.

The fibrous textile substrate is in particular a woven fabric of natural textile fibers, for example of cotton, or of synthetic textile fibers, for example of polyester.

In particular embodiments of the invention, a second impregnation layer is located between the web of fibers and the fibrous textile substrate. This second impregnation layer is preferably of a constitution similar to that of the first impregnation layer, which coats the web of fibers on its external face. It ensures a good cohesion between the web of fibers and the fibrous textile substrate. It is preferably made of the same polymer binder and the same plasticizing agent or mixture of plasticizing agents as the first impregnation layer located on the external face of the web of fibers.

In particular embodiments of the invention, the first impregnation layer, located on the external face of the web of fibers, contains a varnish, which improves the aesthetic aspect of the material, especially in varying the brightness of the material surface. As an example, the first impregnation layer can comprise between 5 and 20% by weight of varnish, with respect to the total weight of the layer. The same applies for the second impregnation layer, when present in the material according to the invention.

This varnish can be an acrylic varnish, which can be matte to obtain a material with a matte aspect, or shiny to obtain a material with a shiny or satin aspect.

The first impregnation layer may contain, in addition to the polymer binder, the plasticizing agent(s) and a varnish, other components, especially one or several conditioning agents, perfumes, bactericides, thickening agents, stabilizers, etc. The person skilled in the art will know how to choose such components and their proportions in the impregnation layer, in order to ensure that they do not interfere negatively with the function of structural adhesive and the plasticizing function of the impregnation layer.

The same applies for the second impregnation layer, when present in the material according to the invention.

A second aspect of the invention is an article formed, at least partially, from a flexible material according to the invention, having one or more of the above characteristics.

Another aspect of the invention is a process of manufacturing a material according to the invention, having one or more of the above characteristics, which comprises:

a step of coating the first face, called the external face, of the web of fibers chosen in the group consisting of carbon fibers, glass fibers, aramid fibers and any combination thereof, with a first so-called impregnation composition containing:
    at least one precursor, and where appropriate several precursors, of said polymer binder, preferably of a copolymer of vinylpyrrolidone and of vinyl acetate, and at least one plasticizing agent or a mixture of plasticizing agents, preferably chosen from adipic acid esters, phthalates or any mixture thereof
and a step of applying a fibrous textile substrate on the second face of said web of fibers, called the internal face, opposite said external face.

The coating step is preferably carried out using a quantity comprised between 250 g and 400 g of impregnation composition per $m^2$ of the web of fibers.

In preferred embodiments of the invention, the process comprises a prior step of preparing, preferentially extemporaneously, the first impregnation composition by mixing the plasticizing agent or mixture of plasticizing agents, one or more precursor monomers for the polymer binder and a curing agent, adequately chosen according to the particular polymer binder to be prepared. This curing agent is conventional in itself and induces the formation of the polymer binder by cross-linking of its precursor monomer(s).

The first impregnation composition may comprise, in addition to the polymer binder or its precursor monomer(s), and optionally a curing agent, and the plasticizing agent(s), a varnish and one or several other components as defined above or precursors thereof.

In particular embodiments of the invention, the process comprises, prior to said step of applying a fibrous textile substrate on the second face of said web of fibers, a step of coating a face of said fibrous textile substrate, more particularly the face intended to be applied on said web of fibers, with a second so-called impregnation composition containing at least one precursor, or where appropriate several precursors, of said polymer binder and at least one plasticizing agent or a mixture of plasticizing agents.

Such a process is advantageously simple and inexpensive to implement.

The process preferably comprises a final step of drying the material, in particular at ambient temperature, during a sufficiently long time to ensure the hardening of the first impregnation layer, and when present, of the second impregnation layer, on the web of fibers.

In specific embodiments, before it being coated, the fibrous textile substrate is laid on a flat surface, for example on a glass plate, which was previously waxed in order to avoid that the substrate adheres to it.

Whether it concerns the fibrous textile substrate or the face(s) of the web of fibers, the coating by each impregnation composition may be carried out in any conventional way, for example with the help of a paintbrush or a roller, ensuring that the composition penetrates well between the fibers.

BRIEF DESCRIPTION OF THE FIGURES

The characteristics and advantages of the invention will appear more clearly from the description of the following particular embodiment, provided as an illustration and in no way limiting the invention, with reference to the single accompanying FIGURE (FIG. 1) which shows a diagrammatic exploded sectional view of a material according to the invention (in reality the different successive layers of the material are all in contact with each other).

IMPLEMENTATION OF THE INVENTION

A flexible material according to an embodiment of the invention is manufactured in the following manner.

A glass plate 1 is waxed with a release wax, in a conventional manner.

The wax is left to dry for 15 minutes, then the plate 1 is wiped. This operation is repeated 3 to 4 times.

A piece of fibrous textile substrate 2, for example of cotton woven fabric, for example with dimensions of 20 cm×20 cm, is then placed on the waxed and wiped glass plate 1.

An impregnation composition is prepared by freshly mixing the additive Softface of the brand Glasurit®, reference 522-111, and the hardener of the same brand, reference 929-33, in a volume of 2:1.

A conventional varnish is incorporated in the composition, in a concentration by weight of 10% with respect to the total weight of the composition.

The face 22 of the piece of cotton woven fabric 2 that is opposite to the face 21 resting on the glass plate 1 is coated with this composition, by means of a brush or a roller, at the rate of 400 g per $m^2$ of fabric.

A web of carbon fibers 3, for example a woven fabric (twill) of carbon fibers, preferably of the same dimensions as the piece of cotton woven fabric 2, is then placed on the coated face 22 of the latter, by its so-called internal face 31.

The external face 32 of the web of carbon fibers 3, opposite to the internal face 31, is then coated with the impregnation composition, at the rate of 400 g per $m^2$ of web 3.

In this example, the first impregnation composition and the second impregnation composition are the same ones. They can otherwise be different from one another.

Any possible air bubbles formed between the layers thus superimposed are eliminated by means of a gas removing device, and the whole is left to dry at ambient temperature for about 24 hours, in order to allow the hardening of the first impregnation layer 4 thus formed on the external face 32 of the web of carbon fibers 3 and the hardening of the second impregnation layer 5 thus formed between the face 22 of the fibrous textile substrate 2 and the internal face 31 of the web of carbon fibers 3.

The flexible material 6 thus obtained is then separated from the waxed glass plate 1.

It presents the aesthetic aspect of the web of carbon fibers 3, it is flexible, resistant, and it can be easily manipulated, in particular bent and deformed, without deterioration. This material is completely adapted for the manufacture of textile articles such as clothing, accessories, etc. It can indeed be easily cut, tailored, embroidered, glued, etc.

The invention claimed is:

1. A flexible material comprising:
   a web of fibers chosen from the group consisting of carbon fibers, aramid fibers, and any combination thereof,
      wherein said web of fibers is impregnated on a first face, called the external face, with between 250 and 400 g/m² of a polymer binder to form a first impregnation layer wherein the impregnation layer comprises at least one adipic acid ester, and wherein the polymer binder consists of a copolymer of vinyl pyrrolidone and of vinyl acetate, and
   a fibrous textile substrate superimposed on a second face of said web of fibers, called the internal face, opposite said external face.

2. A material according to claim 1, wherein the first impregnation layer contains a mixture of at least one adipic acid ester and at least one phthalate.

3. A material according to claim 1, wherein a second impregnation layer is located between the web of fibers and the fibrous textile substrate.

4. A material according to claim 3, wherein said second impregnation layer is of a constitution similar to the first impregnation layer.

5. A material according to claim 1, wherein the first impregnation layer contains a varnish.

6. An article formed from a material according to claim 1.

7. A process of manufacturing the material according to claim 1, comprising a step of coating the first face, called the external face, of the web of fibers with between 250 and 400 g/m² of a first composition containing at least one precursor of said polymer binder and at least one plasticizing agent or a mixture of plasticizing agents, the at least one plasticizing agent being selected from the group consisting of adipic acid esters, and comprising a step of applying the fibrous textile substrate on the second face of said web of fibers, called the internal face, opposite said external face.

8. A process according to claim 7, comprising a final step of drying the material during a sufficiently long period to ensure hardening of said first composition.

9. A process according to claim 7, comprising, prior to said step of applying the fibrous textile substrate on the second face of said web of fibers, a step of coating a face of said fibrous textile substrate intended to be applied on said web of fibers, with a second composition containing at least one precursor of said polymer binder and at least one plasticizing agent or a mixture of plasticizing agents.

10. A process according to claim 9, comprising a final step of drying the material during a sufficiently long period to ensure hardening of said second composition.

11. An article formed from a material according to claim 1.

12. An article formed from a material according to claim 2.

13. An article formed from a material according to claim 3.

14. An article formed from a material according to claim 4.

15. An article formed from a material according to claim 5.

16. A process of manufacturing the material according to claim 2, comprising a step of coating the first face, called the external face, of the web of fibers with between 250 and 400 g/m² of a first composition containing at least one precursor of said polymer binder and at least one plasticizing agent or a mixture of plasticizing agents, the at least one plasticizing agent being selected from the group consisting of adipic acid esters, and comprising a step of applying the fibrous textile substrate on the second face of said web of fibers, called the internal face, opposite said external face.

17. A process of manufacturing the material according to claim 3, comprising a step of coating the first face, called the external face, of the web of fibers with between 250 and 400 g/m² of a first composition containing at least one precursor of said polymer binder and at least one plasticizing agent or a mixture of plasticizing agents, the at least one plasticizing agent being selected from the group consisting of adipic acid esters, and comprising a step of applying the fibrous textile substrate on the second face of said web of fibers, called the internal face, opposite said external face.

18. A process of manufacturing the material according to claim 4, comprising a step of coating the first face, called the external face, of the web of fibers with between 250 and 400 g/m² of a first composition containing at least one precursor of said polymer binder and at least one plasticizing agent or a mixture of plasticizing agents, the at least one plasticizing agent being selected from the group consisting of adipic acid esters, and comprising a step of applying the fibrous textile substrate on the second face of said web of fibers, called the internal face, opposite said external face.

\* \* \* \* \*